(12) United States Patent
Larsen

(10) Patent No.: US 7,977,925 B2
(45) Date of Patent: Jul. 12, 2011

(54) SYSTEMS AND METHODS INVOLVING STARTING VARIABLE SPEED GENERATORS

(75) Inventor: Einar Vaughn Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 393 days.

(21) Appl. No.: 12/098,134

(22) Filed: Apr. 4, 2008

(65) Prior Publication Data

US 2009/0251109 A1 Oct. 8, 2009

(51) Int. Cl.
*H02P 11/00* (2006.01)
*H02P 9/00* (2006.01)
*H02H 7/06* (2006.01)
*F01D 15/10* (2006.01)
*F02C 6/00* (2006.01)
*H02K 7/18* (2006.01)
*H02P 9/04* (2006.01)

(52) U.S. Cl. .................................. 322/36; 290/52
(58) Field of Classification Search .................. 322/36; 290/52
See application file for complete search history.

(56) References Cited

U.S. PATENT DOCUMENTS

| | | | | |
|---|---|---|---|---|
| 1,480,708 A * | 1/1924 | Fortescue | ...................... | 363/150 |
| 3,343,001 A | 9/1967 | Grimsdale et al. | .............. | 307/87 |
| 3,539,906 A * | 11/1970 | Habock | ............................ | 322/24 |
| 3,902,073 A * | 8/1975 | Lafuze | ............................. | 290/46 |
| 3,908,161 A * | 9/1975 | Messenger | ...................... | 322/29 |
| 4,093,869 A * | 6/1978 | Hoffmann et al. | ............... | 290/31 |
| 4,400,659 A | 8/1983 | Barron et al. | .................... | 322/32 |
| 4,458,193 A * | 7/1984 | Jonsson | ......................... | 318/803 |
| 4,481,459 A * | 11/1984 | Mehl et al. | ....................... | 322/10 |
| 4,625,160 A * | 11/1986 | Hucker | ............................ | 322/32 |
| 4,743,777 A * | 5/1988 | Shilling et al. | ................... | 290/46 |
| 4,772,814 A * | 9/1988 | Lewus | ............................. | 310/72 |
| 4,906,060 A | 3/1990 | Claude | ............................ | 322/29 |
| 4,947,100 A * | 8/1990 | Dhyanchand et al. | ........... | 322/10 |
| 4,992,721 A * | 2/1991 | Latos | ................................ | 322/10 |
| 5,013,929 A * | 5/1991 | Dhyanchand | .................... | 290/31 |
| 5,015,941 A * | 5/1991 | Dhyanchand | .................... | 322/10 |
| 5,031,086 A * | 7/1991 | Dhyanchand et al. | ........... | 363/37 |
| 5,055,700 A * | 10/1991 | Dhyanchand | .................... | 290/31 |
| 5,068,590 A * | 11/1991 | Glennon et al. | .................. | 322/10 |
| 5,097,195 A * | 3/1992 | Raad et al. | ....................... | 322/10 |
| 5,309,081 A * | 5/1994 | Shah et al. | ........................ | 322/10 |
| 5,387,859 A * | 2/1995 | Murugan et al. | ................. | 322/10 |
| 5,430,362 A * | 7/1995 | Carr et al. | ....................... | 318/779 |
| 5,483,139 A * | 1/1996 | Welles, II | ........................ | 318/782 |
| 5,495,163 A * | 2/1996 | Rozman et al. | .................. | 322/10 |
| 5,581,168 A * | 12/1996 | Rozman et al. | ................. | 318/723 |

(Continued)

FOREIGN PATENT DOCUMENTS

EP 0858153 A1 8/1998

(Continued)

OTHER PUBLICATIONS

UK Search Report, Date of Mailing: Jul. 21, 2009, GB Application GB0905605.2.

(Continued)

*Primary Examiner* — Pedro J Cuevas
(74) *Attorney, Agent, or Firm* — Cantor Colburn LLP

(57) ABSTRACT

An exemplary method for starting a generator, the method comprising, starting a rotor with an AC voltage across the rotor. Starting a stator. Increasing a speed of the rotor.

10 Claims, 4 Drawing Sheets

U.S. PATENT DOCUMENTS

| | | | | |
|---|---|---|---|---|
| 5,594,322 A | * | 1/1997 | Rozman et al. | 322/10 |
| 5,656,922 A | * | 8/1997 | LaVelle et al. | 322/46 |
| 5,736,829 A | * | 4/1998 | Goff | 318/704 |
| 5,811,946 A | * | 9/1998 | Mullin et al. | 388/811 |
| 5,929,612 A | * | 7/1999 | Eisenhaure et al. | 322/47 |
| 5,969,497 A | * | 10/1999 | McDonald et al. | 318/778 |
| 6,054,776 A | | 4/2000 | Sumi | 290/17 |
| 6,137,187 A | * | 10/2000 | Mikhail et al. | 290/44 |
| 6,252,331 B1 | * | 6/2001 | Mildice et al. | 310/263 |
| 6,348,743 B1 | | 2/2002 | Sakasai et al. | 290/40 B |
| 6,420,795 B1 | * | 7/2002 | Mikhail et al. | 290/44 |
| 6,486,640 B2 | | 11/2002 | Adams | 322/59 |
| 6,504,261 B2 | * | 1/2003 | Fogarty et al. | 290/52 |
| 6,566,764 B2 | * | 5/2003 | Rebsdorf et al. | 290/44 |
| 6,600,240 B2 | * | 7/2003 | Mikhail et al. | 307/85 |
| 6,636,013 B2 | * | 10/2003 | Zeh | 318/727 |
| 6,741,059 B2 | * | 5/2004 | Gokhale et al. | 318/700 |
| 6,762,512 B2 | * | 7/2004 | Nelson | 290/52 |
| 6,799,125 B2 | * | 9/2004 | Lau et al. | 702/38 |
| 6,838,779 B1 | * | 1/2005 | Kandil et al. | 290/31 |
| 6,847,128 B2 | * | 1/2005 | Mikhail et al. | 290/44 |
| 6,856,038 B2 | * | 2/2005 | Rebsdorf et al. | 290/44 |
| 6,856,039 B2 | * | 2/2005 | Mikhail et al. | 290/44 |
| 6,862,538 B2 | * | 3/2005 | El-Ibiary | 702/38 |
| 6,960,900 B2 | * | 11/2005 | Fogarty et al. | 322/29 |
| 6,998,726 B2 | * | 2/2006 | Sarlioglu et al. | 290/31 |
| 7,023,167 B2 | * | 4/2006 | Smith | 318/727 |
| 7,119,452 B2 | | 10/2006 | Larsen | 290/55 |
| 7,135,830 B2 | * | 11/2006 | El-Ibiary | 318/561 |
| 7,184,902 B2 | * | 2/2007 | El-Ibiary | 702/60 |
| 7,218,075 B2 | * | 5/2007 | Schwarz | 318/778 |
| 7,301,311 B2 | * | 11/2007 | Xu et al. | 322/59 |
| 7,309,930 B2 | | 12/2007 | Suryanarayanan et al. | 290/55 |
| 7,342,757 B2 | * | 3/2008 | Huang et al. | 361/23 |
| 7,358,698 B2 | * | 4/2008 | Seguchi et al. | 318/700 |
| 7,400,056 B2 | * | 7/2008 | McGinley et al. | 290/46 |
| 7,408,321 B2 | * | 8/2008 | Smith | 318/788 |
| 7,411,309 B2 | * | 8/2008 | Hudson | 290/44 |
| 7,423,412 B2 | * | 9/2008 | Weng et al. | 322/20 |
| 7,425,771 B2 | * | 9/2008 | Rivas et al. | 290/44 |
| 7,449,795 B2 | * | 11/2008 | Nelson | 290/52 |
| 7,466,109 B1 | | 12/2008 | Larsen et al. | 322/59 |
| 7,471,058 B2 | * | 12/2008 | Duarte et al. | 318/791 |
| 7,501,785 B2 | * | 3/2009 | Schwarz | 318/778 |
| 7,508,086 B2 | * | 3/2009 | Huang et al. | 290/44 |
| 7,514,806 B2 | * | 4/2009 | Xu et al. | 290/31 |
| 7,605,483 B2 | * | 10/2009 | Kern et al. | 290/4 A |
| 7,612,519 B2 | * | 11/2009 | Smith | 318/788 |
| 7,622,815 B2 | * | 11/2009 | Rivas et al. | 290/44 |
| 7,687,928 B2 | * | 3/2010 | Taneja et al. | 290/36 R |
| 7,723,937 B2 | * | 5/2010 | Kurosawa et al. | 318/400.34 |
| 7,821,145 B2 | * | 10/2010 | Huang et al. | 290/31 |
| 7,915,869 B2 | * | 3/2011 | Xu et al. | 322/59 |
| 2002/0079706 A1 | * | 6/2002 | Rebsdorf et al. | 290/55 |
| 2002/0093305 A1 | * | 7/2002 | Zeh | 318/727 |
| 2002/0105189 A1 | * | 8/2002 | Mikhail et al. | 290/44 |
| 2003/0206804 A1 | * | 11/2003 | Smith | 417/44.1 |
| 2003/0209910 A1 | * | 11/2003 | Nelson | 290/52 |
| 2004/0019439 A1 | * | 1/2004 | El-Ibiary | 702/57 |
| 2004/0026929 A1 | * | 2/2004 | Rebsdorf et al. | 290/44 |
| 2004/0094964 A1 | * | 5/2004 | Mikhail et al. | 290/44 |
| 2004/0108726 A1 | * | 6/2004 | Sarlioglu et al. | 290/38 R |
| 2004/0207208 A1 | * | 10/2004 | Mikhail et al. | 290/44 |
| 2004/0263109 A1 | * | 12/2004 | Schwarz | 318/778 |
| 2005/0067991 A1 | * | 3/2005 | El-Ibiary | 318/490 |
| 2005/0071095 A1 | * | 3/2005 | El-Ibiary | 702/60 |
| 2005/0253396 A1 | * | 11/2005 | Mikhail et al. | 290/44 |
| 2005/0286180 A1 | * | 12/2005 | Huang et al. | 361/23 |
| 2006/0087293 A1 | * | 4/2006 | Xu et al. | 322/59 |
| 2006/0140788 A1 | * | 6/2006 | Smith | 417/410.1 |
| 2006/0140789 A1 | * | 6/2006 | Smith | 417/410.1 |
| 2006/0273752 A1 | * | 12/2006 | Duarte et al. | 318/791 |
| 2006/0290316 A1 | * | 12/2006 | Seguchi et al. | 318/720 |
| 2007/0024247 A1 | * | 2/2007 | Ichinose et al. | 322/24 |
| 2007/0052244 A1 | * | 3/2007 | Hudson | 290/44 |
| 2007/0069522 A1 | | 3/2007 | Barton et al. | 290/44 |
| 2007/0085343 A1 | | 4/2007 | Fortmann | 90/44 |
| 2007/0118307 A1 | * | 5/2007 | El-Ibiary | 702/60 |
| 2007/0118308 A1 | * | 5/2007 | El-Ibiary | 702/60 |
| 2007/0164567 A1 | | 7/2007 | Luetze et al. | 290/44 |
| 2007/0164700 A1 | * | 7/2007 | Schwarz | 318/778 |
| 2007/0177314 A1 | * | 8/2007 | Weng et al. | 361/20 |
| 2007/0194572 A1 | * | 8/2007 | Xu et al. | 290/31 |
| 2007/0222220 A1 | * | 9/2007 | Huang et al. | 290/31 |
| 2007/0262583 A1 | * | 11/2007 | Kikuchi et al. | 290/44 |
| 2008/0079262 A1 | * | 4/2008 | McGinley et al. | 290/31 |
| 2008/0093850 A1 | * | 4/2008 | Taneja et al. | 290/36 R |
| 2008/0100243 A1 | * | 5/2008 | Kurosawa et al. | 318/430 |
| 2008/0143113 A1 | * | 6/2008 | Ichinose et al. | 290/44 |
| 2008/0150471 A1 | * | 6/2008 | Unsworth et al. | 318/771 |
| 2008/0277938 A1 | | 11/2008 | Oohara et al. | 290/44 |
| 2008/0303280 A1 | * | 12/2008 | Xu et al. | 290/31 |
| 2008/0303490 A1 | * | 12/2008 | Xu et al. | 322/29 |
| 2009/0066089 A1 | | 3/2009 | Arinaga et al. | 290/55 |
| 2009/0066297 A1 | * | 3/2009 | Ichinose et al. | 322/29 |
| 2009/0174188 A1 | * | 7/2009 | Huang et al. | 290/46 |
| 2009/0218072 A1 | * | 9/2009 | Eriksen | 165/80.2 |
| 2009/0243417 A1 | * | 10/2009 | Xu et al. | 310/184 |
| 2009/0273185 A1 | * | 11/2009 | Ruiz Flores et al. | 290/44 |
| 2009/0278354 A1 | * | 11/2009 | Ichinose et al. | 290/44 |
| 2010/0134074 A1 | * | 6/2010 | Crane | 322/79 |
| 2011/0050184 A1 | * | 3/2011 | Said et al. | 322/95 |
| 2011/0068753 A1 | * | 3/2011 | XU et al. | 322/32 |

FOREIGN PATENT DOCUMENTS

| | | | |
|---|---|---|---|
| JP | 2009254231 A | * | 10/2009 |
| WO | 2007099936 A1 | | 9/2007 |

OTHER PUBLICATIONS

UK Search Report, Date of Mailing: Jul. 23, 2009, GB Application GB0905606.0.

* cited by examiner

Starting with Max Flux, 3300v Drive

Starting with Max Flux, 3300v Drive

Starting with Max Flux, 3300v Drive

Starting with Max Flux, 3300v Drive

US 7,977,925 B2

SYSTEMS AND METHODS INVOLVING STARTING VARIABLE SPEED GENERATORS

BACKGROUND OF THE INVENTION

Embodiments of the invention relate generally to electrical power generators, and more particularly to starting and running variable speed electrical power generators.

In this regard, many electrical generators are started by inducing current in a stator with a stator converter and inducing a current in a rotor with a rotor converter. The current from the stator converter interacts with flux in the machine to create torque in the generator. The torque turns the generator rotor and a prime mover of the generator. When the generator prime mover reaches a rated starting speed, fuel is ignited in the prime mover of the generator. Once the prime mover is operating, the generator may be aligned electrically for power generation.

During the start sequence of a generator, the stator converter sends current to the stator and a rotor converter sends current to the rotor. The relationship between the voltages and frequencies of the stator and rotor currents affect the flux in the generator and the torque induced by the stator to start the generator. In starting, the voltage in the stator is increased until the stator converter reaches a rated voltage and frequency limit. The voltage rating of the stator converter limits the flux induced in the generator, so that at some speed the flux must be reduced according to the voltage limit of the stator converter. This results in a limitation on the torque available for starting the generator.

Many electrical power generators use rotor converters that output DC current to the rotor. Since the DC current does not have a frequency, frequency of the rotor current cannot be adjusted. The limitation on adjusting the frequency of the rotor current limits the available starting torque that may be produced by the stator.

It is desirable to increase the available flux and torque in a generator stator during a start sequence.

BRIEF DESCRIPTION OF THE INVENTION

A method for starting a generator, the method comprising, starting a rotor with an AC voltage across the rotor. Starting a stator. Increasing a speed of the rotor.

An alternate method starting a generator, the method comprising, starting a rotor, starting a stator having a first phase sequence, increasing a speed of the rotor, and applying a second phase sequence to the rotor.

An exemplary embodiment of an electrical generation system comprising, a generator, wherein the generator includes, a stator, a rotor, and a speed controller with a first logic operative to control the speed of the generator, a variable frequency generator (VFG) exciter, wherein the VFG exciter includes, a first converter operative to supply AC power to the stator, and a second converter operative to supply AC power to the rotor, a VFG exciter controller with a second logic operative to control the operation of the VFG exciter, the second logic being further operative to start a second converter operative to apply current to the rotor with an AC voltage across the rotor, start a first converter operative to apply current to the stator, and increase a speed of the rotor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Further, various operations may be described as multiple discrete steps performed in a manner that is helpful for understanding embodiments of the present invention. However, the order of description should not be construed as to imply that these operations need be performed in the order they are presented, or that they are even order dependent. Moreover, repeated usage of the phrase "in an embodiment" does not necessarily refer to the same embodiment, although it may. Lastly, the terms "comprising," "including," "having," and the like, as used in the present application, are intended to be synonymous unless otherwise indicated.

Figure 1:
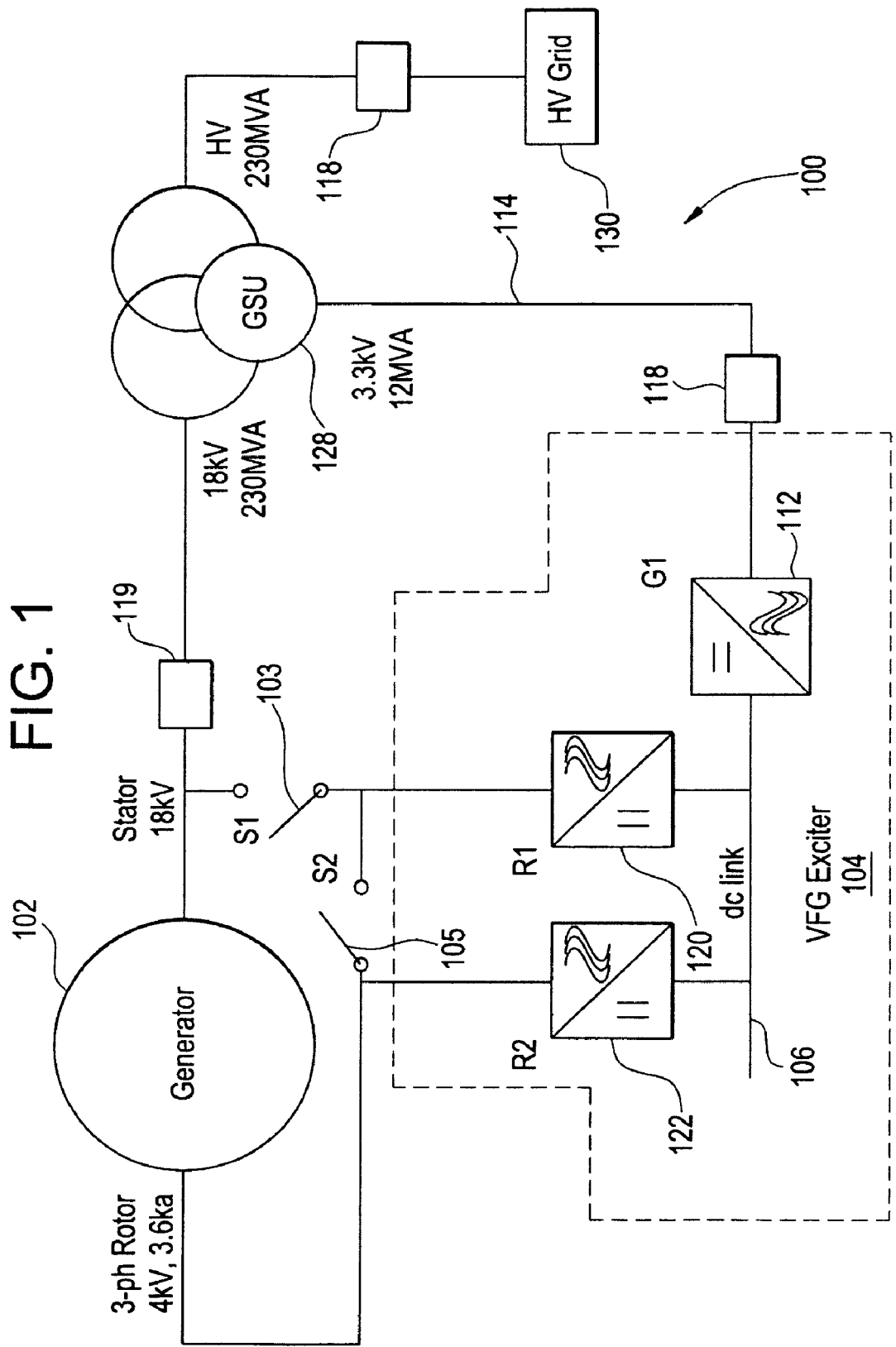
FIG. 1 is a block diagram of an exemplary system for generating electrical power.

In this regard, referring to FIG. 1, the system 100 includes a generator 102. In the illustrated exemplary embodiment, generator 102 is a gas turbine generator with a three phase rotor (not shown) rated for 4 kV, 3.6 kA and a stator (not shown) rated for 18 kV, however the generator 102 may be rated for other loads as needed by design. In the illustrated embodiment, the generator 102 includes 3 slip rings. The generator 102 rotor and stator are connected to a variable frequency generator (VFG) exciter 104 via a first switch (S1) 103 and a second switch (S2) 105.

The VFG exciter 104 includes a DC link 106. A converter (G1) 112 is connected to the DC link 106 and a 3.3 kV source 114 via a breaker 118. The VFG exciter 104 also includes a first converter (R1) 120 and a second converter (R2) 122 each connected to the DC link 106. R2 is also connected to the generator 102 rotor. R1 120 is connected to S1 103 and S2 105 such that when S2 105 is closed R1 120 is connected in parallel with R2 122 to the generator 102 rotor. When S2 105 is open and S1 103 is closed, R1 120 is connected to the generator 102 stator. The VFG exciter is controlled by a controller having a processor.

In the illustrated exemplary embodiment, the power output of the generator 102 stator is connected via a breaker 119 to a tertiary winding on the generator step-up unit (GSU) 128. The GSU outputs power to the 3.3 kV source 114 and a high voltage (HV) grid 130. A breaker 118 may be disposed between the HV grid 130. Modes of operation of the system 100 include running and starting. In running operation, the VFG exciter 104 receives AC power from the 3.3 kV source 114 via the breaker 118. G1 112 receives the AC power and converts the AC power to DC power to power the DC link 106. The G1 112 may also transform the AC voltage of the 3.3 kV source 114 to an appropriate voltage prior to converting the AC power to DC power.

R1 120 and R2 122 receive the DC power from the DC link 106 and convert the DC power to AC power (4 kV, 3.6 kA) for the generator 102 rotor. While in running operation, S1 103 is open and S2 105 is closed. Thus, R1 120 and R2 122 connect in parallel to the generator 102 rotor.

The generator 102 outputs AC power via a generator breaker 119 to the GSU 128 for voltage conversion. In the illustrated embodiment, the GSU 128 includes a tertiary winding. The GSU converts the output voltage (18 kV) of the generator 102 to the appropriate voltages for the 3.3 kV source 114 and the HV grid 130. In the illustrated example, the GSU 128 sends 3.3 kV, 12 MVA to the 3.3 kV source 114 and 230 MVA to the HV grid 130. Breaker 118 may be disposed between the HV grid 130 and the GSU 128. Harmonic filters (not shown) may be included on the 3.3 kV source 114 and the generator 102 rotor.

In starting operation, the generator 102 stator receives power (torque current) to turn the generator 102 from the VFG exciter 104. The generator 102 rotor also receives power from the VFG exciter 104. The turning of the generator 102 rotates the generator 102 prime mover. Once the prime mover is rotating at an appropriate speed, the fuel in the prime mover ignites, and the generator 102 begins to generate power. When the generator 102 begins to generate power, the system 100 may be configured to operate in a running condition.

In this regard, while in starting operation, the generator breaker 119 is open, S1 103 is closed, and S2 105 is open. Thus, VFG exciter 104 provides power to the generator 102 stator via R1 120, and also provides power to the generator 102 rotor via R2 122. Once the generator 102 prime mover has started, the power to the generator 102 stator is no longer needed, and the system 100 transitions into running operation. Thus, R1 120 is blocked, S1103 opens and S2 105 closes placing R1 120 and R2 122 in parallel. The VFG exciter 104 nulls the voltage across the generator breaker 119 independent of speed (within slip range), and the generator breaker may be closed to provide power to the HV grid 130.

Starting the generator 102 quickly and efficiently may be most effectively accomplished when the generator 102 stator outputs the most torque possible given the configuration and rating of the components in the system 100. Thus, it is desirable to use a starting method that allows the generator 102 output more torque than other methods.

Figure 2:
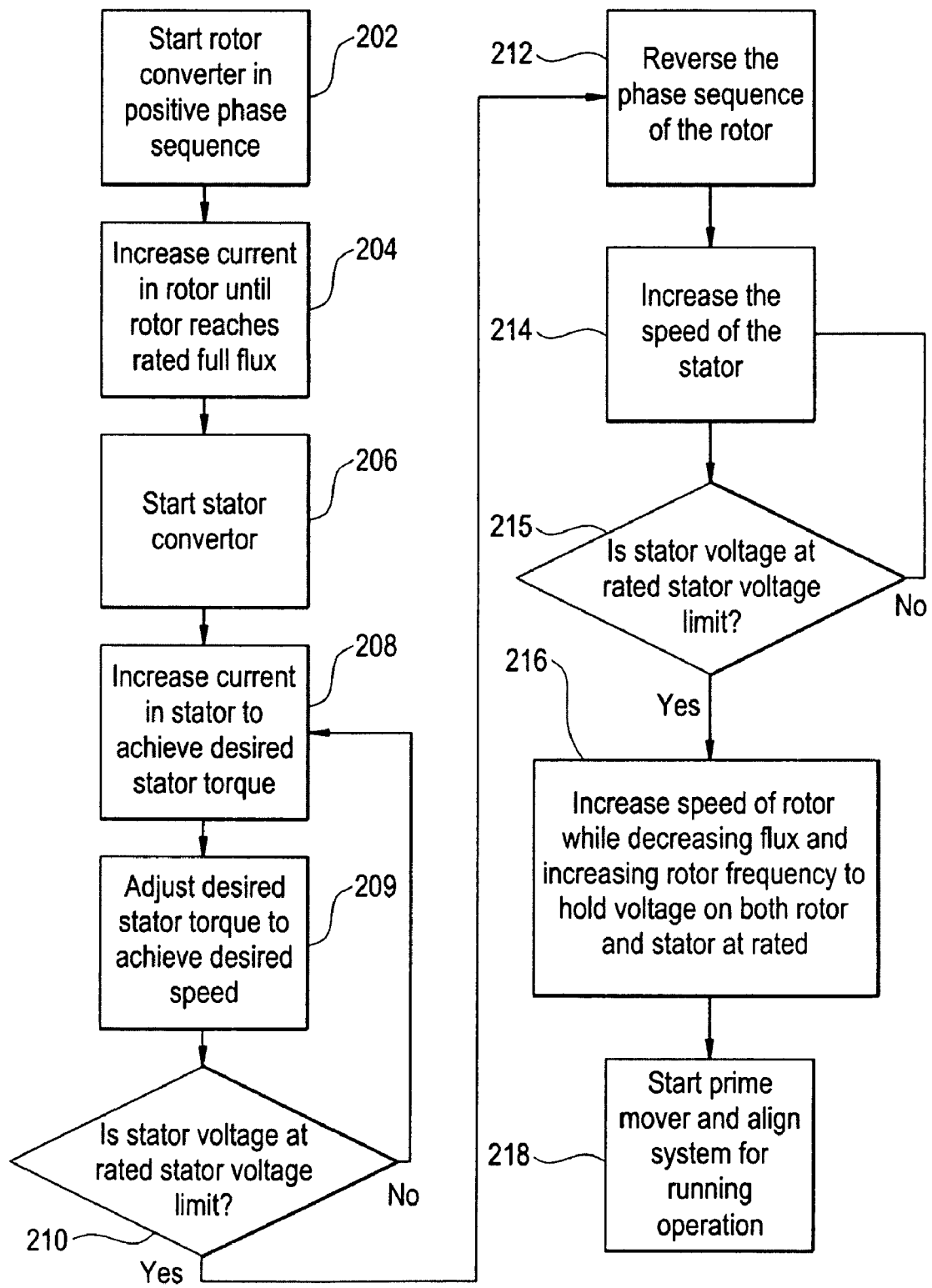
FIG. 2 is a flow diagram of an exemplary method for starting an electrical generator.
Figure 3A:
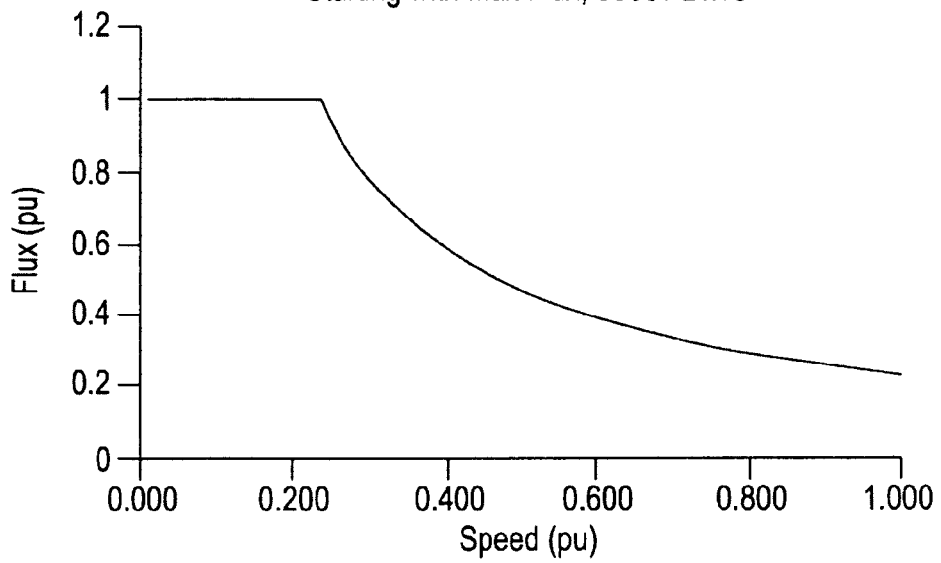
FIG. 3 is four plots A-D illustrating exemplary parameters of the exemplary method for starting an electrical generator of FIG. 2.
Figure 3B:
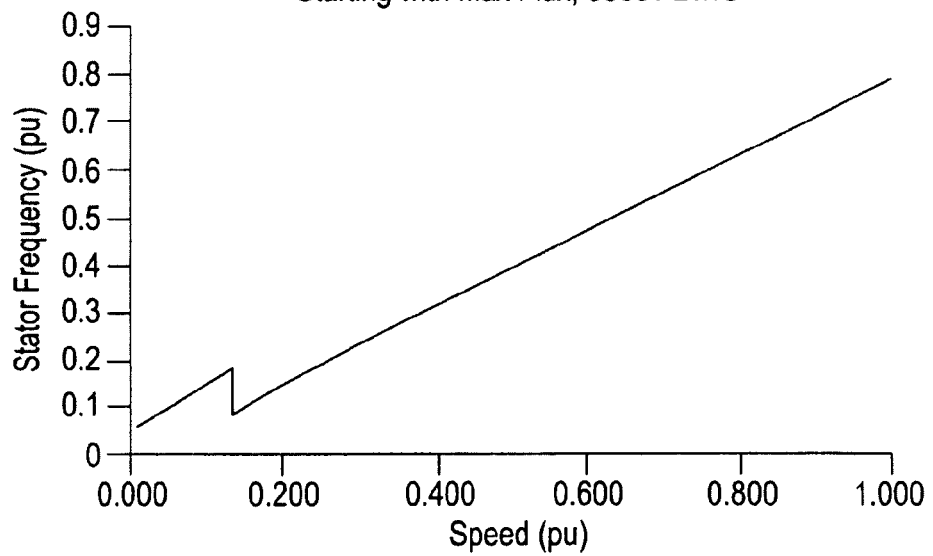
Figure 3C:
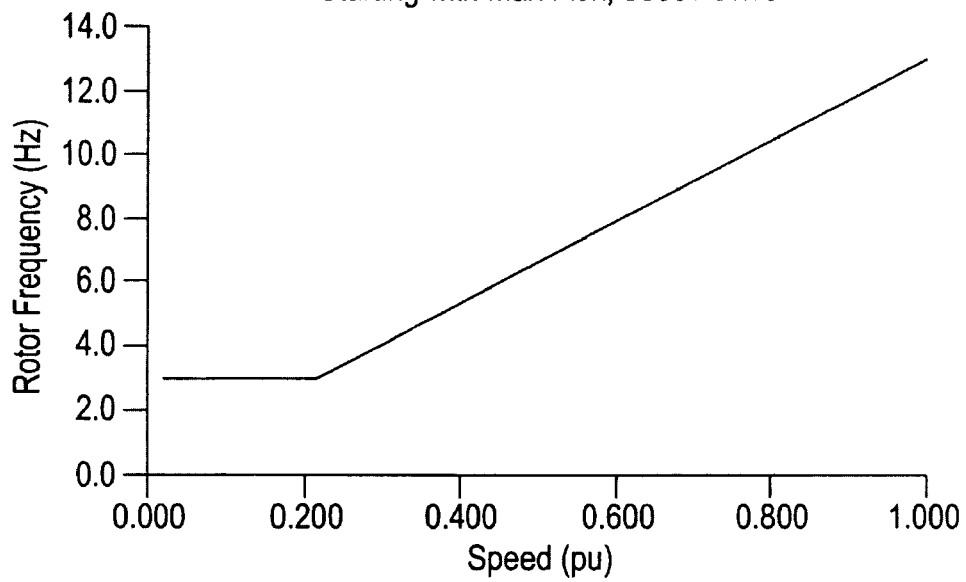
Figure 3D:
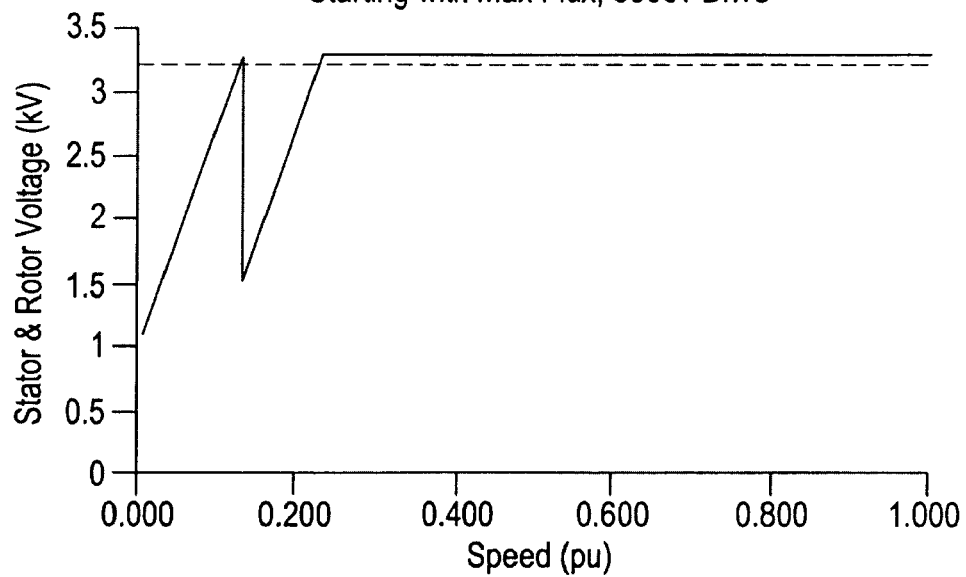

An exemplary starting method is described in more detail in FIG. 2 and FIG. 3. Referring to FIG. 2, the R2 122 is started in a positive phase sequence in block 202. The frequency of R2 122 should allow a rated rotor current and generator flux to be produced within the rating of the converter R2 122. The current is increased until the generator 102 reaches the rated full flux in block 204. In block 206, the converter R1 120 is started. The converter R1 120 frequency is the frequency of R2 122 plus the speed of the rotor. At start, since the rotor speed equals 0, the R1 120 frequency equals the R2 122 frequency. The R1 120 converter will match the frequency and voltage of the R2 122 to reach the current needed to achieve desired torque. In block 208, the current is increased in the stator to achieve a desired torque in the generator 102. In block 209, the desired stator torque is adjusted via the speed regulator of the generator 102 to achieve desired speed. The speed command may increase monotonically over time.

Referring to FIG. 3, plot A shows the flux in the generator to be 1 pu while the generator speed is 0 pu. The rotor frequency is approximately 3 Hz as shown in plot C, while the stator current frequency is approximately 0.05 pu as shown in plot B. In the illustrated embodiment, the machine rated frequency is 60 Hz, so 3 Hz on the rotor is the same as 0.05 pu on the stator, i.e. stator and rotor frequency are the same. Referring to Plot D, the rotor voltage is constant at approximately 3.3 kV and the stator voltage is approximately 1.1 kV.

As the speed increases, the stator voltage and frequency also increase as shown in plots D and B. Responsive to the stator reaching the rated stator voltage limit, in block 210, the phase sequence of the rotor is reversed in block 212.

Once the phase sequence of the rotor is reversed, the frequency and voltage of the stator is reduced. As speed continues to increase, the stator frequency and voltage will again increase. In block 215, responsive to the stator reaching the rated stator voltage limit in block 214, the method progresses to block 216. In the illustrated example, the stator voltage reaches the rated limit at a speed of approximately 0.22 pu.

In block 216, the rotor current is decreased to lower flux so that as speed further increases R1 120 and R2 122 operate at a constant voltage. The constant voltage may be, for example, the respective rated voltages of R1 120 and R2 122. Plot A illustrates the reduction of flux in the generator as the speed of the generator is increased. Plot D illustrates that once the rated voltage of the stator is reached, the voltage of the stator remains constant.

Once the rated starting speed of the prime mover, (e.g., a gas turbine) is reached, the prime mover may be started, and the system may be aligned to operate the generator 102 in a running mode of operation as shown in block 218.

The table below summarizes the method of FIG. 2. In this regard, there are three general states of the starting operation that correspond to the blocks of FIG. 2.

| State of Operation | I | II | III |
| --- | --- | --- | --- |
| Corresponding blocks from FIG. 2 | 202-210 | 212-215 | 216 |
| Speed range | 0 to Speed 1 | Speed 1 to Speed 2 | >speed 2 |
| Generator Flux | Rated | Rated | Decreasing |
| Rotor Current | Constant | Constant | Decreasing |
| Rotor Frequency | Minimum | Minimum | Increasing |
| Rotor Phase Sequence | Positive | Negative | Negative |
| Rotor Voltage | Rated | Rated | Rated |
| Stator Frequency | Increasing from Minimum | Increasing from Minimum | Increasing |
| Stator Phase Sequence | Positive | Positive | Positive |
| Stator Voltage | Increasing to Rated | Increasing to Rated | Rated |

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method for starting a generator, the method comprising:

starting a rotor with an AC voltage across the rotor, the AC voltage supplied by an AC voltage source connected to the rotor;

starting a stator; and
increasing a speed of the rotor.

2. The method of claim 1, further comprising increasing a current in the rotor until the generator reaches a rated full flux.

3. The method of claim 1, further comprising increasing a current in the stator to achieve a desired stator torque responsive to starting the stator.

4. The method of claim 1, wherein the rotor is started with a first phase sequence.

5. The method of claim 4, further comprising reversing the first phase sequence of a rotor converter responsive to a stator voltage reaching a rated stator voltage limit, wherein the reversing of the phase sequence of the rotor converter lowers the stator voltage.

6. The method of claim 1, further comprising increasing a speed of the generator until a stator voltage reaches a rated stator voltage limit.

7. The method of claim 1, further comprising increasing a frequency of the current in the rotor and a speed of the rotor and a frequency of the current in the stator and the speed of the generator until a first speed of the generator is reached.

8. The method of claim 1, further comprising increasing a frequency of the current in the rotor and a speed of the rotor and a frequency of the current in the stator and the speed of the generator until a starting speed of a prime mover of the generator is reached.

9. An electrical generation system comprising:
a generator, wherein the generator includes:
a stator;
a rotor; and
a speed controller with a first logic operative to control the speed of the generator;
a variable frequency generator (VFG) exciter, wherein the VFG exciter includes:
a first converter operative to supply AC power to the stator; and
a second converter connected to the rotor operative to supply AC power to the rotor;
a VFG exciter controller with a second logic operative to control the operation of the VFG exciter, the second logic being further operative to:
start a second converter operative to start the rotor with an AC voltage across the rotor;
start a first converter operative to start the stator; and
increase a speed of the rotor.

10. The system of claim 9, wherein the second logic is further operative to increase a current in the rotor until the generator reaches the rated full flux.

* * * * *